United States Patent [19]

Casey

[11] Patent Number: 5,280,960

[45] Date of Patent: Jan. 25, 1994

[54] WHEEL-HOUSING SHELL

[75] Inventor: John Casey, Tramore, Ireland

[73] Assignee: H. P. Chemie Pelzer Ltd., Tramore, Ireland

[21] Appl. No.: 521,528

[22] Filed: May 10, 1990

[30] Foreign Application Priority Data

May 10, 1989 [IE] Ireland ................. 1529/89

[51] Int. Cl.⁵ ............................................. B62D 25/18
[52] U.S. Cl. ..................................... 280/848; 280/851
[58] Field of Search ............... 280/851, 847, 848, 849, 280/852, 853

[56] References Cited

U.S. PATENT DOCUMENTS

| | | | |
|---|---|---|---|
| 3,834,732 | 9/1974 | Schons | 280/851 |
| 4,205,861 | 6/1980 | Roberts et al. | 280/851 |
| 4,290,619 | 9/1981 | Goodall | 280/851 |
| 4,378,120 | 3/1983 | Laine | 280/848 X |
| 4,625,983 | 12/1986 | Tye | 280/851 |
| 4,722,541 | 2/1988 | Gray et al. | 280/851 |

FOREIGN PATENT DOCUMENTS

| | | | |
|---|---|---|---|
| 243283 | 10/1987 | European Pat. Off. | 280/851 |
| 2524344 | 12/1976 | Fed. Rep. of Germany | 280/851 |
| 2934145 | 6/1980 | Fed. Rep. of Germany | |
| 3539146 | 5/1987 | Fed. Rep. of Germany | 280/851 |
| 2014525 | 8/1979 | United Kingdom | 280/851 |

Primary Examiner—Margaret A. Focarino
Assistant Examiner—Michael Mar

[57] ABSTRACT

A wheel-housing shell for incorporation in mudguards of a motor vehicle extends at least approximately parallel to the mudguard and over a considerable part of the inner periphery of the mudguard; the shell forms a hose-like channel having an air inlet at its end at the front in the driving direction and at its other end an air outlet directed towards the roadway, is improved in that the wheel-housing shell is equipped with orifices which assist and make easier the passage of water splashes into the channel; and such a wheel-housing shell is covered with a sound attenuating filter mat on the side of the respective shell facing the wheel and over the respective entire surface that extends parallel to the mudguard.

8 Claims, 2 Drawing Sheets

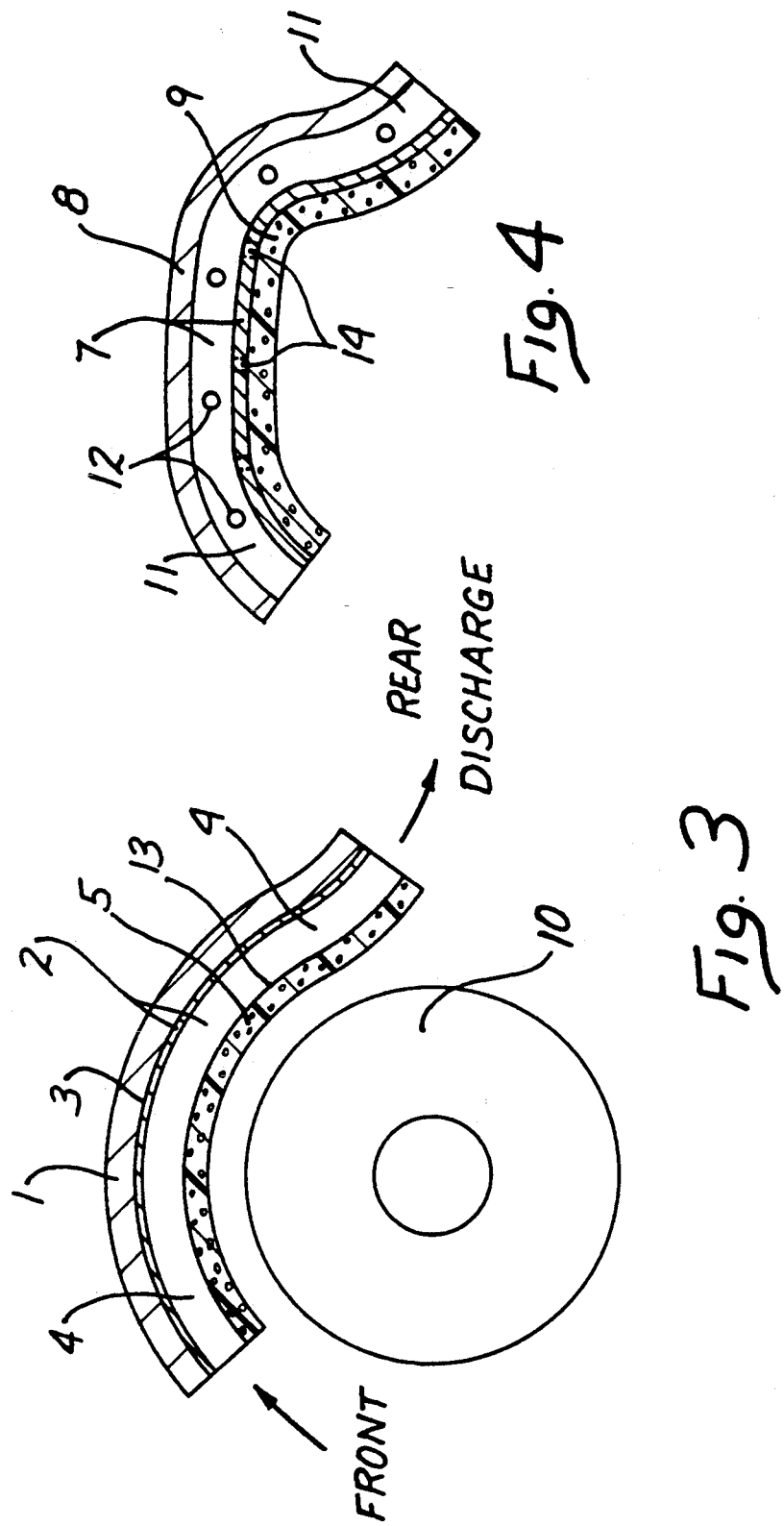

WHEEL-HOUSING SHELL

BACKGROUND OF THE INVENTION

The present invention relates to a wheel-housing shell for incorporation in mudguards of a motor vehicle, which extends at least approximately parallel to the mudguard over a considerable part of the inner periphery of the mudguard and which forms with this a hose-like channel having an air inlet at its end at the front in the driving direction and at its other end an air outlet directed towards the roadway, the wheel-housing shell being equipped with orifices which assist or make easier the passage of water splashes into the channel.

In wheel-housing shells of the above described type, an air flow from their front end to the rear end is generated during motoring. At the same time, a vacuum occurs in the channel, and this draws the water splashes which occur through the orifices in the wheel-housing shell into the channel and diverts them towards the roadway by means of the air flow. This prevents the water splashes from escaping from the mudguard laterally and therefore also the particular vehicle or other road users from being soiled and/or impeded.

A wheel-housing shell of the type described in the introduction is described in U.S. Pat. No. 4,378,120 corresponding to British Patent 2,039,260 and German patent 2,934,145 A1. In this disclosure the vacuum is generated in the space between a mudguard designated by reference numeral 4 in these patents and wheel-housing shell (called a supplementary mudguard 1 in these patents) by guiding the wheel-housing shell at some distance underneath the vehicle floor (see passage 2 in these patents). The air flow between roadway and vehicle floor thus generates a vacuum in the channel between mudguard and wheel-housing shell, so that this space remains dry and clean and corrosion of the mudguard is therefore counteracted.

In another disclosure according to DE 2,524,344 A1, the channel is open towards the wheel and is equipped in the orifice with numerous baffle strips which draw the water splashes flying off from the wheel into the channel from where they are guided onto the roadway.

The disadvantage of the above mentioned arrangements is that their effect is restricted, whether they are mainly intended to counteract the corrosion of the mudguard, as in DE 2,934,145, or as in DE 2,524,344 A1, a considerable proportion of the water splashes bounces off from the wheel-housing shell or for other reasons are not picked up by the suction occurring between the baffle strips, for example because the vacuum in the channel is too low as a result of a temporary decrease in speed.

Another disadvantage is to be seen in the fact that the air flow and the impact of the water cause disturbing and annoying noise.

DESCRIPTION OF THE INVENTION

The object of the present invention is to provide a wheel-housing shell, in which a relatively large proportion of the water splashes is picked up and furthermore there is a reduction of annoying noise.

According to the invention, the object of the invention is achieved because the wheel-housing shell of the type described in the introduction is covered with a porous filter mat on its side facing the wheel and over its entire surface extending parallel to the mudguard.

The particular advantage of the solution according to the invention is to be seen in the fact that the proportion of the water splashes which bounces off is drastically reduced and also that part of the water splashes not subjected to a sufficient suction effect is sucked up as a result of the porosity of the filter mat.

Since the filter mat dries out continuously because of the air flow from the side of the channel, the absorbed water is drawn through the porosity in this region of the filter mat. The filter mat thus serves to some extent as an intermediate store for the water. At the same time the mat produces attenuation of the air-flow noises which occur. Finally, the acoustic effect of the impact of stones and water noise is also attenuated.

Advantageously the wheel-housing shell consists of corrugated material, the corrugations of which extend parallel to the mudguard, the filter mat resting against its wave crests facing the wheel. Thus, the wave valleys facing the wheel act as channels for the water splashes. If the wave valleys facing the inner wall of the mudguard are not filled, a channel keeping the inner wall of the mudguard dry can be formed hereto, in conformity with the version according to DE 2,934,145 A1. Moreover, the use of corrugations results in a structure resistant to bending and to distortion.

In another embodiment the wheel-housing shell consists of a perforated plate or of a grid made, for example, of plastics. This embodiment is especially easy to produce.

To generate a sufficient suction effect in the channel, it is advantageous if the wheel-housing shell has sides which extend perpendicularly relative to the wheel axis and which possess perforations not covered by the filter mat.

The filter mat itself is advantageously multi-layered formed from layers of differing porosity and/or thickness. It is advantageous at the same time to arrange the layer of greater porosity towards the wheel, because this makes it easier for the water to be absorbed.

A web material on a plastic base is particularly suitable as a material for the filter mat. This material has the advantage of a high corrosion resistance, good processability and a high noise damping and cleaning capacity.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 3 and 4 are respectively longitudinal section views as indicated by line III—III in FIG. 1 and line IV—IV in FIG. 2, the figures being essentially an improvement of the general curved mud-guard configuration shown the above referenced U.S. Pat. No. 4,378,120;

Proceeding now to the detailed description of the drawings, FIGS. 1 and 3 illustrate respectively a cross-section and a longitudinal section through the inside of the mudguard 1 against which rests corrugation apex, at points 3, a wheel-housing shell 2. Shell 2 is comprised of corrugated material and has downwardly oriented apexes 13. A filter mat 5 facing any such wheel 10 rests with its opposite side against the other set of apex points 13. Spaces between corrugation apexes 13 serve as channels 4 receiving the water which comes out of the filter mat 5. The channels 4 facing the mat are thus of open construction in that they can receive whatever water penetrates the mat 5.

The water is sucked up by the vacuum prevailing in the channels 4. The vacuum is the result of the airflow through the channels 4 being of open construction in that they face down but are covered by the mat 5. The water that is sucked through the mat 5 is rearwardly discharged and conveyed to the roadway. If the in-between channels 6 are not filled, these channels 6 can act to keep the inside of the mudguard dry and thus prevent corrosion.

Figure 1:
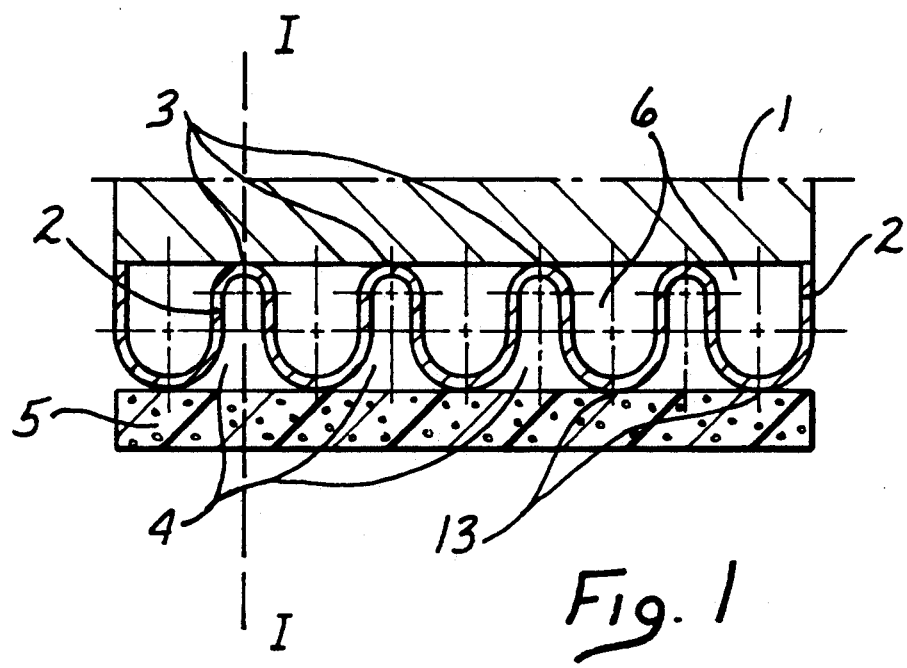
FIGS. 1 and 2 are cross-sections through wheel-housing shells according to the teaching of the preferred embodiment of the invention, and in a partially diagrammatic representation.
Figure 2:
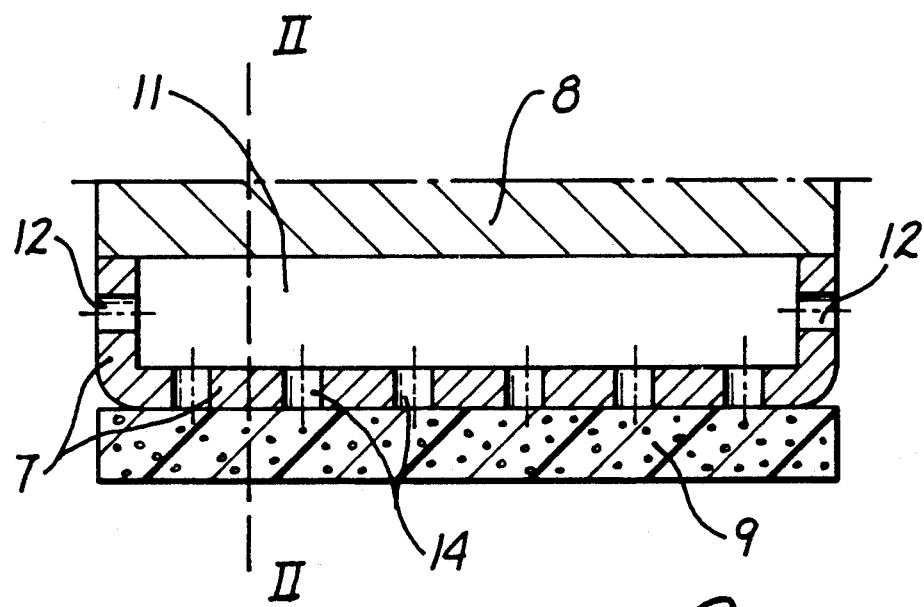

In FIG. 2, a wheel-housing shell 7 has an essentially U-shaped profile and section. Shell 7 rests with its outer edges against the inner face of a mudguard 8 and is itself covered with a filter mat 9 on the side facing the wheel. Owing to the U-shape of the shell 7 a channel 11 is established. Bores 10 in the shell 7 render the channel open in a direction away from the mudguard 8. These bores 10 in the U-shaped bottom of the wheel-housing shell 7 serve for the passage of the water out of the filter mat 9 into the channel 11 and in radial direction, while bores 12 in the U-shaped legs serve for generating a sufficient vacuum.

FIG. 4 shows the lateral openings in the shell 7. The downwardly oriented openings 12 shown directly in FIG. 2 and in phantom lines in FIG. 4, establish the open construction of the channel 11 defining shell structure 7.

The invention is not limited to the embodiments described above but all changes and modifications thereof, not constituting departures from the spirit and scope of the invention, are intended to be included.

I claim:

1. A mudguard of a motor vehicle extending above and around a wheel of the vehicle, there being a wheel housing shell which extends at least approximately parallel to the mudguard over a considerable part of an inner periphery of the mudguard and forming a hose-like channel having an air inlet at a front end in the driving direction and an air outlet at a rear end directed towards a roadway, the improvement comprising, in combination,
    the channel as defined by the wheel-housing shell having a top surface facing the mudguard and a bottom surface facing the wheel, said bottom surface having an open portion; and
    a filter mat extending parallel to the mudguard, said filter mat covering the bottom surface of the wheel housing shell and overlying the open portion, wherein water spray from the wheel having been soaked up by the mat filter enters the channel radially from the mat through the open portion flows in the channel, and is discharged through the air outlet at said rear end and toward the roadway.

2. A mudguard according to claim 1 in which the channel, is made of a corrugated material having corrugation wavecrests extending parallel to the mudguard, the filter mat resting against said wavecrests.

3. A mudguard according to claim 1, the wheel housing shell being a perforated plate.

4. A mudguard according to claim 1, in which the shell has sides which extend perpendicularly relative to the wheel axis between said top and bottom surfaces and which possess perforations not covered by the filter mat.

5. A mudguard according to claim 1, in which the filter mat is a multilayered filter formed from layers of differing porosity and/or thickness.

6. A mudguard according to claim 1, in which the filter mat consists of weblike materials.

7. A mudguard construction for a motor vehicle which includes a mudguard proper extending above and around a wheel of the vehicle, a wheel housing shell which extends at least approximately parallel to the mudguard over a considerable part of an inner periphery of the mudguard and forming therewith a curved channel having an air inlet at a front end in the driving direction and an air outlet at an end rearwardly directed towards a roadway, the improvement comprising in combination;
    the wheel-housing shell having a top surface facing the mudguard and a bottom surface for the channel, said bottom surface facing away from the mudguard, the bottom surface having orifices also facing away from the mudguard; and
    a filter mat on the bottom surface of the shell facing the respective wheel and covering the orifices so that water spray from the wheel which has been soaked up by the mat enters the channel through the orifices, passes through the channel and is discharged through the air outlet at said rearward end.

8. A mudguard construction for a motor vehicle extending above and around a wheel of the vehicle, there being a wheel housing shell which extends at least approximately parallel to the mudguard over a considerable part of an inner periphery of the mudguard and forming therewith a channel means having an air inlet being directed toward a front of the vehicle in the driving direction and having another end serving as an air outlet at a rearward end directed towards a roadway, the improvement comprising, in combination.
    the wheel-housing shell being of a corrugated construction, having a first set of apices connected to the mudguard and having a second set of apices facing away from the mudguard, there being a plurality of channels of the channel means respectively between the second set of apices; and
    filter mat means on the second set apices and covering the respective channels so that water spray from the wheel which has been soaked up by the mat enters the channels radially and is discharged through the air outlet at said rearward end.

* * * * *